US010442965B2

(12) United States Patent
Gleyal et al.

(10) Patent No.: US 10,442,965 B2
(45) Date of Patent: Oct. 15, 2019

(54) PANEL EDGE ENCLOSURES

(71) Applicant: Zephyros, Inc., Romeo, MI (US)

(72) Inventors: Sylvain E. Gleyal, Rochester, MI (US); Laurent Meistermann, Ostwald (FR)

(73) Assignee: Zephyros, Inc., Romeo, MI (US)

( * ) Notice: Subject to any disclaimer, the term of this patent is extended or adjusted under 35 U.S.C. 154(b) by 0 days.

(21) Appl. No.: 15/789,102

(22) Filed: Oct. 20, 2017

(65) Prior Publication Data
US 2018/0037785 A1 Feb. 8, 2018

Related U.S. Application Data

(63) Continuation of application No. 14/823,258, filed on Aug. 11, 2015, now Pat. No. 9,796,891.

(60) Provisional application No. 62/035,677, filed on Aug. 11, 2014.

(51) Int. Cl.
*C09J 163/00* (2006.01)
*B32B 43/00* (2006.01)
*B32B 37/18* (2006.01)

(52) U.S. Cl.
CPC ............. *C09J 163/00* (2013.01); *B32B 43/00* (2013.01); *B32B 37/18* (2013.01); *B32B 2479/00* (2013.01); *B32B 2605/00* (2013.01); *B32B 2607/00* (2013.01)

(58) Field of Classification Search
CPC ...................................................... B32B 37/12
See application file for complete search history.

(56) References Cited

U.S. PATENT DOCUMENTS

| | | | |
|---|---|---|---|
| 625,559 | A | 5/1899 | Keeler |
| 3,317,471 | A | 5/1967 | Johnson et al. |
| 3,473,950 | A | 10/1969 | Wong |
| 3,485,282 | A | 12/1969 | Lopez et al. |
| 4,093,491 | A | 6/1978 | Whelpton |
| 4,438,254 | A | 3/1984 | Doorakian et al. |
| 4,507,461 | A | 3/1985 | Bowditch |
| 4,612,156 | A | 9/1986 | Heinemeyer et al. |
| 4,647,648 | A | 3/1987 | Silvis et al. |
| 4,800,643 | A | 1/1989 | Higgins |
| 4,981,735 | A | 1/1991 | Rickson |
| 5,089,588 | A | 2/1992 | White et al. |
| 5,115,075 | A | 5/1992 | Brennan et al. |
| 5,134,201 | A | 7/1992 | Billovits et al. |
| 5,164,472 | A | 11/1992 | White et al. |
| 5,240,543 | A | 8/1993 | Fetterhoff et al. |
| 5,266,133 | A | 11/1993 | Hanley et al. |
| 5,275,853 | A | 1/1994 | Silvis et al. |
| 5,401,814 | A | 3/1995 | Schomaker et al. |
| 5,464,924 | A | 11/1995 | Silvis et al. |
| 5,686,551 | A | 11/1997 | White et al. |
| 5,708,042 | A | 1/1998 | Hasegawa |
| 5,731,094 | A | 3/1998 | Brennan et al. |
| 5,741,042 | A | 4/1998 | Livingston et al. |
| 5,766,719 | A | 6/1998 | Rimkus |
| 5,834,078 | A | 11/1998 | Cavitt et al. |
| 5,852,163 | A | 12/1998 | Chen et al. |
| 5,962,093 | A | 10/1999 | White et al. |
| 5,962,621 | A | 10/1999 | Beckerdite et al. |
| 6,011,111 | A | 1/2000 | Brennan et al. |
| 6,180,715 | B1 | 1/2001 | Schmidt |
| 6,270,600 | B1 | 8/2001 | Wycech |
| 6,287,666 | B1 | 9/2001 | Wycech |
| 6,365,079 | B1 | 4/2002 | Winkler et al. |
| 6,376,583 | B1 | 4/2002 | Winkler et al. |
| 6,391,408 | B1 | 5/2002 | Hutchinson |
| 6,407,225 | B1 | 6/2002 | Mang et al. |
| 6,455,116 | B1 | 9/2002 | Xia et al. |
| 6,455,146 | B1 | 9/2002 | Fitzgerald |
| 6,589,621 | B1 | 7/2003 | Beckerdite et al. |
| 6,723,443 | B2 | 4/2004 | Tsai et al. |
| 6,811,864 | B2 | 11/2004 | Czaplicki et al. |
| 6,846,559 | B2 | 1/2005 | Czaplicki et al. |
| 6,855,652 | B2 | 2/2005 | Hable et al. |
| 7,125,461 | B2 | 10/2006 | Czaplicki et al. |
| 7,150,902 | B2 | 12/2006 | Farha |
| 7,318,873 | B2 | 1/2008 | Czaplicki et al. |
| 7,581,932 | B2 | 9/2009 | Coupe et al. |
| 7,784,186 | B2 | 8/2010 | White et al. |

(Continued)

FOREIGN PATENT DOCUMENTS

DE 3012288 A1 10/1981
EP 1356911 A2 10/2003

(Continued)

OTHER PUBLICATIONS

H. Craig Silvis & Jerry E. White "Synthesis and Properties of Thermoplastic Poly(amino ether) Barrier Resins"; Polymer News, 1998, vol. 23, pp. 6-10.
"New Dow Resins Combine Qualities of Epoxies and Thermoplastics"; Beverage Online dated Dec. 16, 1999.
New Resin on Blox Opens Avenues for Dow; Plastic News, Dec. 20, 1999, vol. 11, Issue 44, p. 4.
Specialty Monomers and Polymers, Synthesis, Properties, and Applications, 2000, Kathleen O. Havelka, ACS Symposium Series 755.
Jerry E. White "Poly (hydroxyaminoethers): A New Family of Epoxy-Based Thermoplastics"; Advanced Materials Dec. 1, 2000.
J. E. White, "Development of New Family Thermoplastics Employing poly(hydroxyamino ether) chemistry", Plastics, Rubber and Composites, 2000, vol. 29.

(Continued)

Primary Examiner — Daniel H Lee
(74) *Attorney, Agent, or Firm* — The Dobrusin Law Firm. PC

(57) ABSTRACT

The present invention contemplates a method for enclosing a panel edge comprising forming a panel structure having at least one edge, applying a reformable epoxy resin material onto the at least one edge, and contacting the reformable epoxy resin material within about 10 minutes, or even about 5 minutes of applying the reformable epoxy resin material such that the reformable epoxy resin material is below its glass transition temperature and dry to the touch upon contact.

18 Claims, No Drawings

(56) References Cited

U.S. PATENT DOCUMENTS

| | | | |
|---|---|---|---|
| 7,879,925 B2 | 2/2011 | Chmielewski et al. | |
| 7,892,396 B2 * | 2/2011 | Sheasley | B60R 13/06 |
| | | | 156/330 |
| 8,430,448 B2 | 4/2013 | Richardson et al. | |
| 2002/0006755 A1 | 1/2002 | North et al. | |
| 2003/0039792 A1 | 2/2003 | Hable et al. | |
| 2003/0045620 A1 | 3/2003 | Carlson et al. | |
| 2003/0099826 A1 | 5/2003 | Juras et al. | |
| 2003/0184121 A1 | 10/2003 | Czaplicki et al. | |
| 2004/0131840 A1 | 7/2004 | Ferguson et al. | |
| 2004/0221953 A1 | 11/2004 | Czaplicki et al. | |
| 2006/0077674 A1 * | 4/2006 | Kleber | B60Q 1/50 |
| | | | 362/459 |
| 2007/0270515 A1 | 11/2007 | Chmielewski et al. | |
| 2008/0029214 A1 | 2/2008 | Hable et al. | |
| 2008/0060742 A1 | 3/2008 | Sheasley et al. | |
| 2008/0306216 A1 * | 12/2008 | Sommerfeld | B32B 27/00 |
| | | | 525/190 |
| 2009/0202294 A1 | 8/2009 | Apfel | |
| 2009/0298974 A1 | 12/2009 | Chmielewski et al. | |
| 2010/0289242 A1 | 11/2010 | Nitsche et al. | |
| 2011/0039470 A1 | 2/2011 | Wakeman et al. | |
| 2011/0220267 A1 | 9/2011 | Blancaneaux | |
| 2011/0278802 A1 | 11/2011 | Nitsche et al. | |
| 2012/0251863 A1 | 10/2012 | Berger et al. | |
| 2013/0020019 A1 | 1/2013 | Nogues et al. | |
| 2015/0096663 A1 | 4/2015 | Siboni et al. | |
| 2015/0096678 A1 | 4/2015 | Siboni et al. | |
| 2016/0046047 A1 | 2/2016 | Gleyal et al. | |
| 2016/0229965 A1 | 8/2016 | Chmielewski et al. | |

FOREIGN PATENT DOCUMENTS

| | | |
|---|---|---|
| EP | 1607204 A2 | 12/2005 |
| EP | 1916285 A1 | 4/2008 |
| JP | H11348160 A | 12/1999 |
| WO | 95/25005 | 9/1995 |
| WO | 98/14498 A1 | 4/1998 |
| WO | 98/36944 | 8/1998 |
| WO | 00/46017 | 8/2000 |
| WO | 2005/058573 A1 | 6/2005 |
| WO | 2007/008569 A1 | 1/2007 |
| WO | 2007/117663 A2 | 10/2007 |
| WO | 2008/010823 | 1/2008 |
| WO | 2008/016889 A1 | 2/2008 |
| WO | 2009/058295 A2 | 5/2009 |
| WO | 2009/124709 A1 | 10/2009 |
| WO | 2009/127638 | 10/2009 |
| WO | 2010/040499 A1 | 4/2010 |
| WO | 2010/054194 | 5/2010 |
| WO | 2010/071525 A1 | 11/2011 |
| WO | 2011/141148 A2 | 11/2011 |
| WO | 2016/130180 A1 | 8/2016 |

OTHER PUBLICATIONS

Susan A. Somers, "PHAE Blox Resins Produced via Reactice Extrusion; Results from a Designed Experiment on a ZSK-40 mm Co-Rotating Twin-Screw Extruder", Mar. 1, 2002, Dow Confidential Information.
Francois Constantin; "Blends of a New Thermoplastic in a Thermoset Epoxy Matrix"; Macromol Symp. 2003, 198 335-344.
Francois Constantin; "Post-Crosslinkable Blends: Reactions Between a Linear Poly(hydroxyl-amino ether) and a Diepoxy" dated Jun. 11, 2004.
Plastics Technology, "Adhesive Maker Develops Thermoplastic Epoxy WPC", dated Feb. 2009.
ICIS.Com, "Trusted Market Intelligence for the Global Chemical and Energy Industries", Dec. 16, 2002.
Jean-Pierre Pascault, "General Concepts and Epoxy Polymers", 2010.
Jerry E. White, "Thermoplastic Epoxy Polymers", 2010.
Potentially Related U.S. Appl. No. 62/130,832, filed Mar. 10, 2015.
Potentially Related U.S. Appl. No. 62/183,380, filed Jun. 23, 2015.
Potentially Related U.S. Appl. No. 62/294,160, filed Feb. 11, 2016.
Potentially Related U.S. Appl. No. 62/296,374, filed Feb. 17, 2016.
Potentially Related U.S. Appl. No. 62/130,908, filed Mar. 10, 2015.
Potentially Related U.S. Appl. No. 62/200,380, filed Aug. 3, 2015.
Potentially Related U.S. Appl. No. 62/296,378, filed Feb. 17, 2016.
Potentially Related U.S. Appl. No. 62/067,131, filed Oct. 22, 2014.
Potentially Related U.S. Appl. No. 62/238,928, filed Oct. 8, 2015.
U.S. Appl. No. 62/010,662, filed Jun. 11, 2014.
U.S. Appl. No. 62/012,573, filed Jun. 16, 2014.
U.S. Appl. No. 62/042,497, filed Aug. 27, 2015.

* cited by examiner

PANEL EDGE ENCLOSURES

TECHNICAL FIELD

The present invention pertains generally to a method of applying an adhesive material, and more particularly to a method of applying an epoxy-based hot-melt adhesive for use as edge enclosures for panel structures.

BACKGROUND

Panel structures are common in a wide variety of industries including building construction, transportation (e.g., automotive, train, aerospace), and furniture construction, among others. It is common to use sandwich panels as flooring, storage compartment doors, or internal walls of aerospace, train and automotive vehicles. These sandwich panels have edges that are exposed and require sealing to avoid water or other materials entering into the panels. Traditionally, the edges are sealed with a liquid paste that is difficult to apply to precise locations, is messy, and takes many hours or even days to cure before allowing for sanding or other finishing processes.

There is thus a need for an adhesive that avoids these common problems encountered with a liquid adhesive, such as an adhesive that is clean, fast adhering and hardening, and capable of bonding to a wide variety of substrates.

SUMMARY OF THE INVENTION

The teachings herein are directed to a method comprising forming a panel structure having at least one edge, heating and applying a reformable epoxy resin material onto the at least one edge, and contacting the reformable epoxy resin material within 10 minutes of applying the reformable epoxy resin material such that the reformable epoxy resin material is below its glass transition temperature and dry to the touch upon contact. The reformable epoxy resin material may fall below its glass transition temperature within less than 10 minutes, less than 5 minutes, or even less than 2 minutes post heating. The reformable epoxy resin material may be extruded onto the at least one edge with a hot-melt gun. After heating and applying, the reformable epoxy resin material may be heated again above its glass transition temperature so the panel edge is open and no longer sealed. The reformable epoxy resin material may fall below its glass transition temperature by virtue of exposure to ambient temperature.

Further contemplated by the present teachings is a method comprising forming a panel structure having at least one edge, applying a reformable epoxy resin material onto the at least one edge by extruding through a hot-melt gun, lowering the temperature of the reformable epoxy resin material so that it is below its glass transition temperature, wherein the temperature is lowered upon exposure to ambient temperature; and contacting the reformable epoxy resin material within 30 minutes, within 20 minutes, or even within 10 minutes of applying the reformable epoxy resin material such that the reformable epoxy resin material is below its glass transition temperature and dry to the touch upon contact. The panel structure may be a furniture panel. The panel structure may be an automotive, train, or aerospace panel. The panel may be utilized in an elevator or in a building façade. The method may be free of use of any liquid paste material. The method may be free of storing the panels until the material falls below its glass transition temperature. The contacting step may include sanding the reformable epoxy resin material.

The teachings herein facilitate a simple process for applying a reformable epoxy resin to seal and/or enclose a panel structure edge whereby the time required for the resin material to fall below its glass transition temperature is short and the use of liquid pastes are avoided.

DETAILED DESCRIPTION

The present teachings meet one or more of the above needs by the improved devices and methods described herein. The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

This application claims the benefit of the filing date of U.S. Provisional Application No. 62/035,677, filed Aug. 11, 2014, the entirety of the contents of this application being hereby incorporated by reference for all purposes.

The teachings herein make advantageous use of a reformable epoxy resin that hardens and adheres when it cools. The teachings herein contemplate a method for providing edge enclosure for panels used in the construction, automobile, transportation, furniture, aircraft and other related industries.

The materials and methods taught herein include possible uses for reformable epoxy resins (RER). It is possible that the RER materials may be provided initially in a pellet form and then formed into an RER mold suitable for locating into a dispensing device. The dispensing device may be one that is suitable for heating hot-melt materials (such as a stick-shaped material which may be utilized in a glue gun device), such that the heat from the dispensing device reduces the viscosity of the material located therein, thus allowing the material to be dispensed (e.g., an injection molding device, heat gun device, potting device or the like). The RER material may be dispensed directly onto a panel edge, the dispensing device and viscosity (e.g., a viscosity that is higher than that of typical liquid paste materials that may be utilized for edge closure purposes) of the material allowing for improved accuracy in locating the material onto the edge in a precise fashion. The RER material may act to not only encapsulate the componentry but also to provide additional bonding between surface sheets and any sandwich material (e.g., any internal or non-face sheet layer of material for forming a composite/sandwich panel) forming the panels. The dispensing device may be of minimal size such that dispensing in precise locations is simplified so that the RER material is dispensed only at desired locations, thus eliminating any cleaning or excess material removal step that may be required with typical paste systems. The dispensing device may be automated such that desired dispensing locations are programmed and the dispensing device dispenses accordingly.

An advantage of the adhesive material of the present teachings over existing epoxy materials used for edge enclosing is that the materials herein can be easily and selectively removed by the addition of heat. Accordingly, unlike traditional liquid adhesives, any adhesive that contacts the facing sheets (e.g., where the adhesive is not wanted) can be easily removed for a cleaner, mess-free application process. In one embodiment, it can be removed my simply chipping the adhesive off of the facing sheet, with no damage to the facing sheet. This may be due to the adhesive's tendency to be more brittle than a traditional thermoplastic material but less brittle than a traditional thermoset material. Additional benefits of the RER material include fast hardening and adhesion, thereby reducing the need for extended periods of cure time during panel manufacture. Adhesion, hardening, and returning to a solid state upon cooling of the RER begins almost immediately after heating is stopped and full adhesion can occur within about 10 seconds to about 60 seconds (e.g., about 30 seconds). It is contemplated that allowing the adhesive to return to ambient temperature is sufficient for adhesion, and additional hardening steps are possible, but not necessary. In addition, an epoxy resin such as RER may be desirable because of its long shelf life. It also may not require storage at a refrigerated temperature, unlike some alternative materials. In addition, the adhesive materials described herein are adapted for simplified color modification. As a result, the resulting edge can be formulated to a desired color for improved aesthetic appearance and to match and/or compliment adjacent surfaces, thus eliminating extra paint or other coloring steps.

Exemplary RER materials may be made with bisphenol A diglycidyl ether (BADGE) and monoethanolamine. For some applications that may require a higher glass transition temperature ($T_g$), it is contemplated that BADGE may be replaced by an epoxy monomer with less mobility. Such epoxy monomers may include diglycidylether of fluoren diphenol or 1,6 napthalene diepoxy. Also, it is contemplated that where fire resistance is desired, BADGE can be replaced by a brominated bisphenol A epoxy resin. The RER material having at least one epoxide group may be hydroxy-phenoxyether polymer, such as a polyetheramine thermoplastic material as described herein. For example, such thermoplastic polymeric material having at least one epoxide group may be a product (e.g., a thermoplastic condensation reaction product) of a reaction of a mono-functional or di-functional species (i.e., respectively, a species having one or two reactive groups, such as an amide containing species), with an epoxide-containing moiety, such as a diepoxide (i.e., a compound having two epoxide functionalities), reacted under conditions for causing the hydroxyl moieties to react with the epoxy moieties to form a generally linear backbone polymer chain with ether linkages.

The panel structures envisioned herein may comprise panels consisting of a core material provided with two facing sheets. In this instance, the core may be of paper, fabric, plastic or metal, such as a metallic grid which may be of aluminum. Similarly, the facing may be of paper, plastic, carbon, glass fiber, metal, or fiber reinforced thermosetting resin such as glass-filled epoxy prepreg. It is also contemplated that the facing or core may be formed from a fabric impregnated with a pre-cut epoxy reformable epoxy resin (RER) film, pultruded RER long fibers, or reformable epoxy tapes or fabrics. Certain composite materials are disclosed in U.S. Provisional Application Nos. 62/130,832, filed Mar. 10, 2015; and 62/183,380, filed Jun. 23, 2015, the entirety of these applications being hereby incorporated by reference for all purposes. Additional composite materials are disclosed in U.S. Provisional Application No. 62/037,199, filed Aug. 14, 2014, the entirety of this application being hereby incorporated by reference for all purposes.

While it is possible to use a liquid material for edge enclosure, the present teachings also contemplate using an adhesive RER film. Using a film can be beneficial, as it avoids bringing additional unwanted mass to the panel, as a liquid adhesive may do. Using a film may protect the panel from pollutions that may be undesirable inside the panel. A film also enables the user to control the quantity and distribution of the adhesive, which may assist in handling the adhesive.

It is contemplated that the adhesive film can be an epoxy-based adhesive, such as a reformable epoxy resin (RER). RER adhesive is an advantageous material, as it allows for faster hardening and adhesion, thereby reducing the need for extended periods of time and large areas of space for curing adhesives in large panels. While RER adhesive may be workable at ambient temperature, it is often desirable to have a heat applying step to soften or melt the RER adhesive to allow it to move or become more workable. Adhesion and hardening of the RER begin almost immediately after heating is stopped and full adhesion can occur within about 10 seconds to about 60 seconds (e.g., about 30 seconds). It is contemplated that allowing the adhesive to return to ambient temperature is sufficient for adhesion, and additional hardening steps are possible, but not necessary.

With an RER adhesive, it is also possible that this bond formed between the adhesive and the substrates such as the panel can be debonded by increasing the temperature over the RER adhesive glass transition temperature ($T_g$) to allow the bonded substrates to be separated.

As used herein, unless otherwise stated, the teachings envision that any member of a genus (list) may be excluded from the genus; and/or any member of a Markush grouping may be excluded from the grouping.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0.001, 0.01 or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the of a range in terms of at "'x' parts by weight of the resulting polymeric blend composition" also contemplates a teaching of ranges of same recited amount of "x" in percent by weight of the resulting polymeric blend composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for all purposes. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist of, or consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. An article comprising:
    a) a panel structure having at least one edge;
    b) a reformable epoxy resin material consisting essentially of a reaction product of bisphenol A diglycidyl ether (BADGE) and monoethanolamine located on the at least one edge; and
    wherein the reformable epoxy resin material is adapted for removal with application of heat.

2. The article according to claim 1, wherein the reformable epoxy resin material is below its glass transition temperature and dry to the touch upon contact in less than 10 minutes after an application of heat.

3. The article according to claim 1, wherein the reformable epoxy resin material is below its glass transition temperature and dry to the touch upon contact in less than 5 minutes after an application of heat.

4. The article according to claim 1, wherein the reformable epoxy resin material is below its glass transition temperature and dry to the touch upon contact in less than 2 minutes after an application of heat.

5. The article according to claim 1, wherein the reformable epoxy resin material is adapted for extrusion onto the at least one edge with a hot-melt gun.

6. The article according to claim 1, wherein the reformable epoxy resin material is below its glass transition temperature at ambient temperature.

7. The article according to claim 1, wherein the panel structure is a furniture panel.

8. The article according to claim 1, wherein the panel structure is an automotive panel.

9. The article according to claim 1, wherein the panel structure is an aerospace panel.

10. The article according to claim 1, wherein the panel structure includes a core material comprising paper, fabric, plastic or metal.

11. The article according to claim 1, wherein the panel structure includes two facing sheets.

12. The article according to claim 11, wherein the panel structure includes a core material comprising an aluminum metallic grid.

13. The article according to claim 11, wherein the facing sheets are comprised of paper, plastic, carbon, glass fiber, metal, or fiber reinforced thermosetting resin.

14. The article according to claim 1, wherein the panel structure includes a core material and two facing sheets and the core material or the two facing sheets are formed from a fabric impregnated with a pre-cut epoxy reformable epoxy resin (RER) film, pultruded RER long fibers, or reformable epoxy tapes or fabrics.

15. The article according to claim 1, wherein the reformable epoxy resin material is an adhesive film.

16. The article according to claim 1, wherein the panel structure is free of liquid paste material.

17. The article according to claim 1, wherein the reformable epoxy resin material includes diglycidylether of fluoren diphenol or 1,6 napthalene diepoxy.

18. An article comprising:
    a) a panel structure having at least one edge and including one or more facing sheets located on the panel structure;
    b) a reformable epoxy resin material including consisting essentially of a reaction product of bisphenol A diglycidyl ether (BADGE) and monoethanolamine located on the at least one edge and/or between the one or more facing sheets and the panel structure; and
    wherein the reformable epoxy resin material is adapted for removal with application of heat.

* * * * *